(12) United States Patent
Zoppitelli et al.

(10) Patent No.: US 6,712,313 B2
(45) Date of Patent: Mar. 30, 2004

(54) CONSTANT VELOCITY DRIVE ROTARY-WING AIRCRAFT ROTOR WITH TORQUE SPLITTING DIFFERENTIAL

(75) Inventors: Elio Zoppitelli, Velaux (FR); Eric Cornille, Salon (FR)

(73) Assignee: Eurocopter (FR)

( * ) Notice: Subject to any disclaimer, the term of this patent is extended or adjusted under 35 U.S.C. 154(b) by 0 days.

(21) Appl. No.: 10/392,644

(22) Filed: Mar. 20, 2003

(65) Prior Publication Data

US 2003/0222171 A1 Dec. 4, 2003

(30) Foreign Application Priority Data

Mar. 28, 2002 (FR) .............................................. 02 03913

(51) Int. Cl.$^7$ ........................... B64C 27/12; B64C 27/58
(52) U.S. Cl. ...................... 244/17.11; 244/7 A; 244/39; 416/151
(58) Field of Search ................................ 244/7 A, 17.11, 244/17.19, 17.23, 17.25, 39; 416/148, 151

(56) References Cited

U.S. PATENT DOCUMENTS

| 2,256,918 A | * | 9/1941 | Young .......................... 416/43 |
|---|---|---|---|
| 4,729,753 A | | 3/1988 | Neathery et al. .............. 464/71 |
| 4,912,999 A | * | 4/1990 | Franks et al. .................. 74/417 |
| 5,145,321 A | | 9/1992 | Flux et al. .............. 416/244 R |
| 5,626,312 A | * | 5/1997 | Head ......................... 244/75 R |
| 6,260,793 B1 | | 7/2001 | Balayn et al. .............. 244/7 R |
| 6,276,633 B1 | | 8/2001 | Balayn et al. ................. 244/56 |

FOREIGN PATENT DOCUMENTS

| EP | 0 276 945 | 8/1988 |
|---|---|---|
| EP | 1 088 755 | 4/2001 |
| WO | WO 01/19673 | 3/2001 |

\* cited by examiner

Primary Examiner—Robert P. Swiatek
(74) Attorney, Agent, or Firm—Sturm & Fix LLP

(57) ABSTRACT

A constant velocity drive mechanism of a rotary-wing aircraft rotor, comprises a torque splitting differential mechanism, comprising a driving disc integral in rotation with a rotor mast and connected to each of two driven discs either side of the driving disc, by a least one connecting pin hinged to each of the discs by one of three ball joint connections. Each of the driven discs is connected to a hub of the rotor by at least one of two driving devices, each of which is also hinged to the hub, so as to drive the hub in rotation about a geometrical axis which can be inclined in all directions about the axis of rotation of the mast.

24 Claims, 8 Drawing Sheets

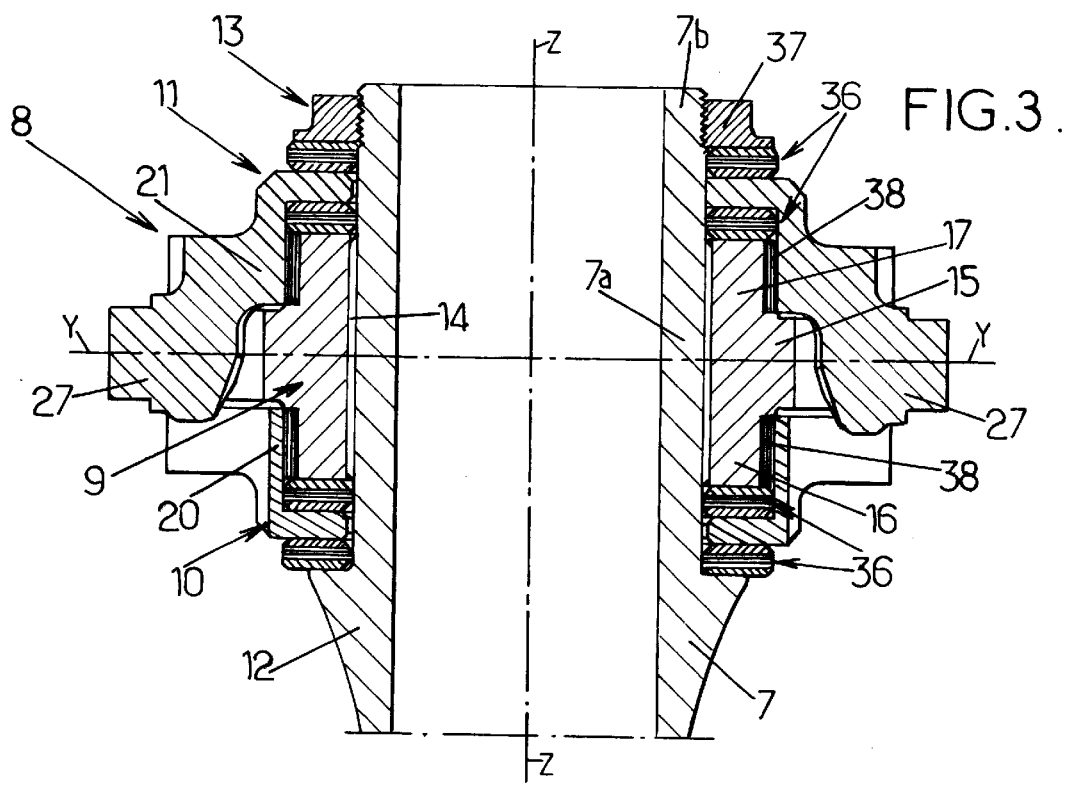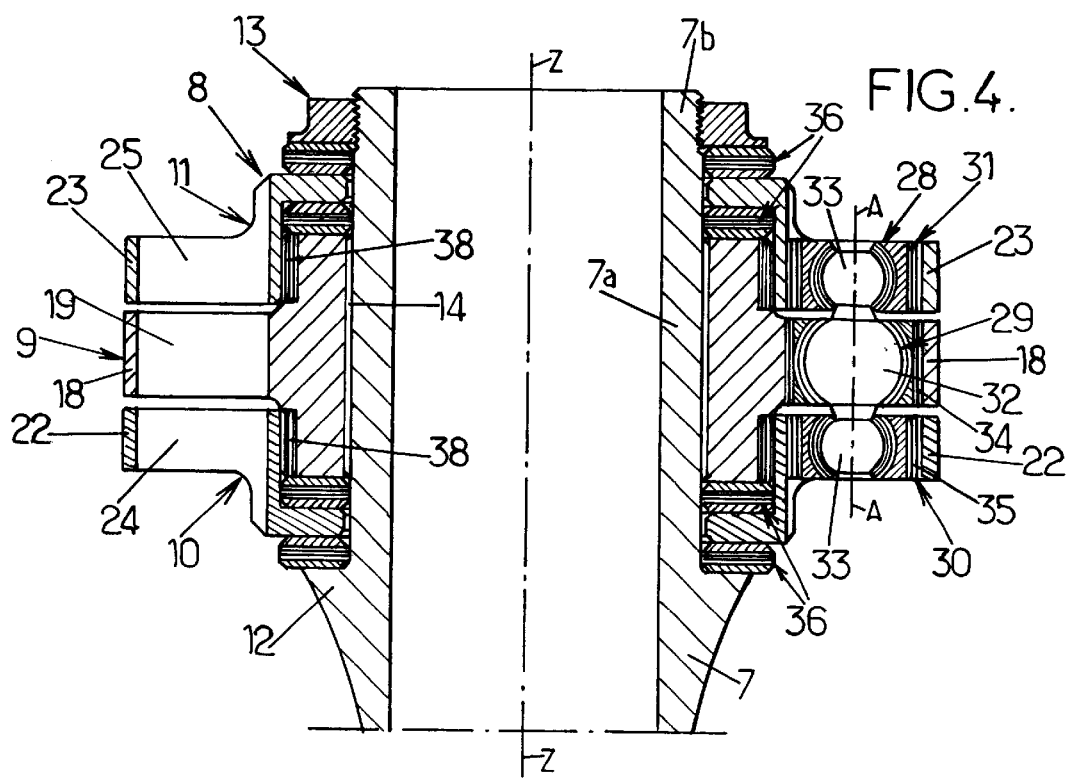

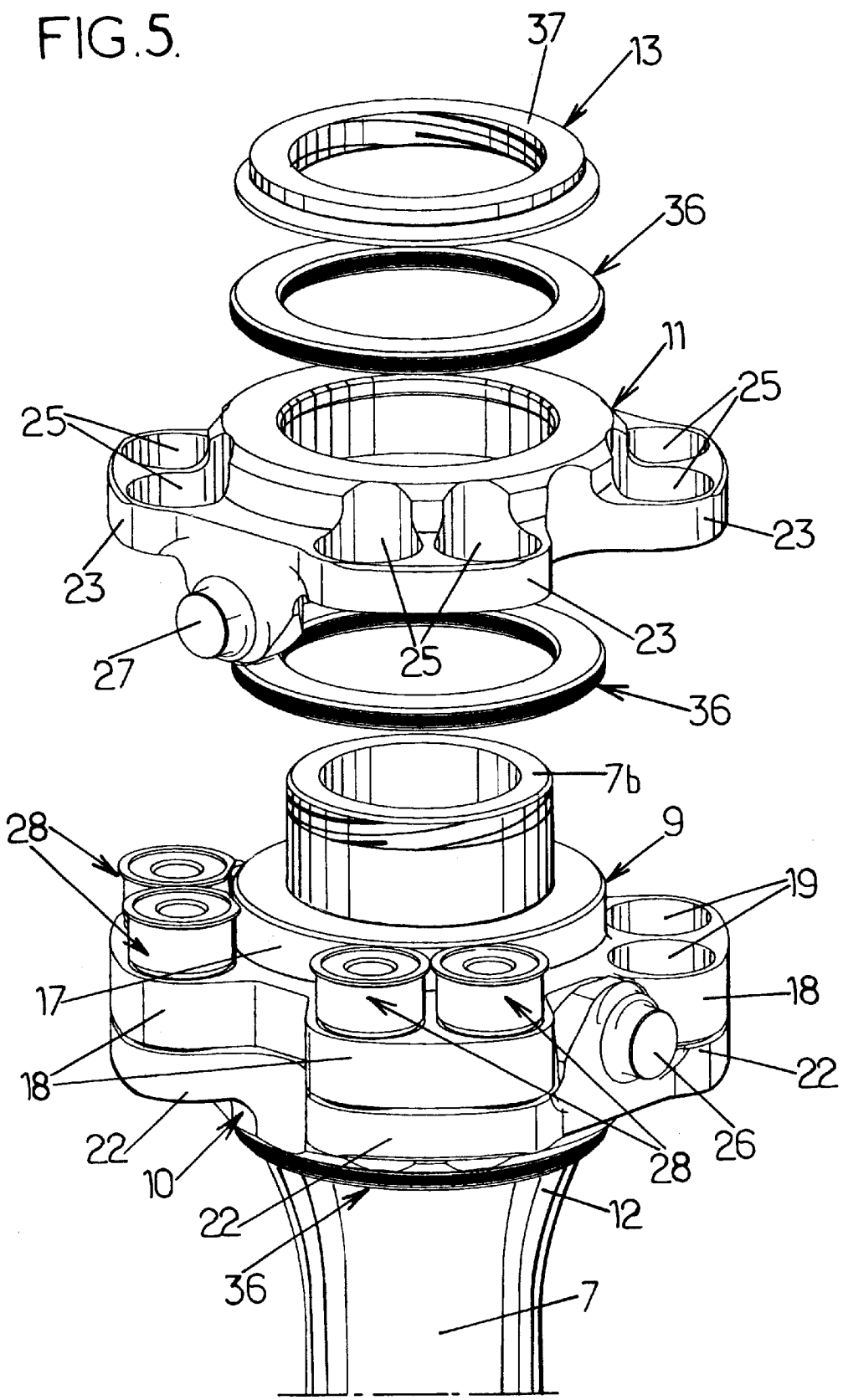

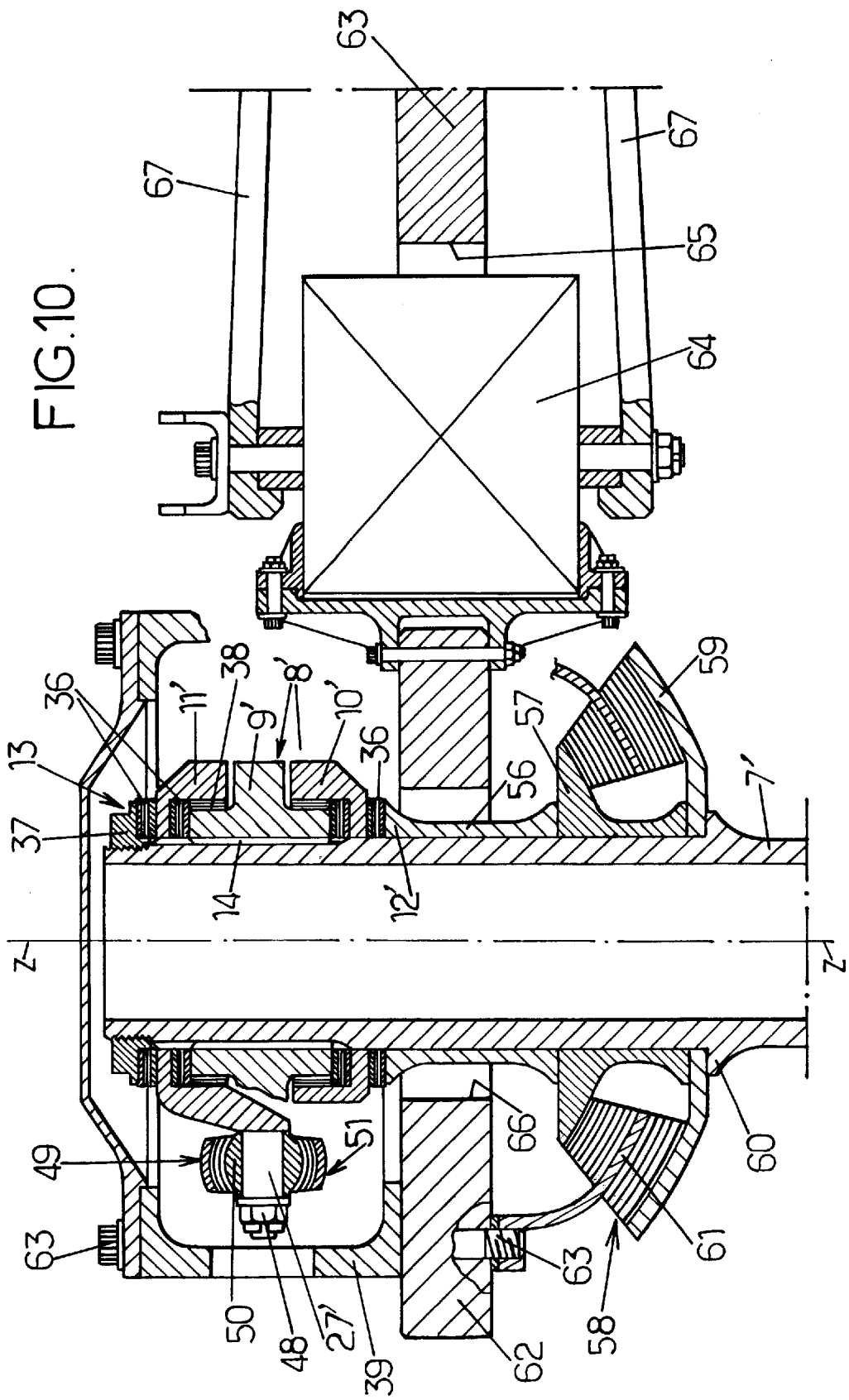

CONSTANT VELOCITY DRIVE ROTARY-WING AIRCRAFT ROTOR WITH TORQUE SPLITTING DIFFERENTIAL

FIELD OF THE INVENTION

The invention relates to a rotary-wing aircraft rotor with constant velocity drive, in particular for a convertible aircraft supporting two generally fixed wings and at least one tilting rotor.

Although the constant velocity drive rotor of the invention can be used as a helicopter rotor, in particular as a tail or anti-torque rotor, a particularly advantageous application of such a constant velocity drive rotor consists in fitting it to convertible aircraft with tilting rotors, particularly of the type known and described in FR 2 791 319, FR 2 791 634 and FR 2 798 359, to which reference may advantageously be made for further details.

Briefly, such a convertible aircraft with tilting rotors generally comprises, as shown schematically in FIG. 1, a fuselage 1, of the aircraft fuselage type, supporting two fixed wings 2, for example high wings, raised with respect to the fuselage 1, each wing 2 itself supporting a power pod 3, housing a power unit driving in rotation a rotor 4, represented schematically by the plane of rotation of the rotor blades, via a transmission (not shown in FIG. 1), a rear reduction gear unit of which is directly driven by the power unit and housed like the latter in the stationary rear part 5 of the power pod 3. The front part 6 of the power pod 3, housing a rotor mast and a rotor hub, as well as a front reduction gear unit driving the rotor mast in rotation, is mounted so as to pivot with the rotor 4, so that it can pivot from an aeroplane configuration, in which the rotor 4 operates as a propeller at the front of an engine pod 5-6 facing into the relative wind, to a helicopter configuration, in which the rotor 4' operates as a helicopter main lifting rotor at the upper end of the front pivoting part of the pod in the upright position 6' above the corresponding wing 2, this latter configuration being used for take-off and landing of the convertible aircraft which, after transition from the helicopter configuration to the aeroplane configuration, is able to move in forward flight like an aircraft.

As a variant, the pods 3 may pivot totally with the rotor 4 with respect to the fixed wings 2.

BACKGROUND TO THE INVENTION

On rotary-wing aircraft rotors, it is known that, since the introduction of the flapping hinge on autogyro and helicopter rotors, tilting the rotor where coning is present, whether this tilting is desired and generated by controlling the cyclic pitch or the unwanted result of the asymmetry between an advancing blade and a retreating blade, causes stresses in the drive plane of the blades which tend to cause the blades to accelerate and decelerate in the course of a revolution of the rotor. These variations in speed are caused by Coriolis forces, and may be illustrated simply by the fact that the trajectory of the blade tips, viewed in a plane perpendicular to the drive axis, is an eccentric ellipse, the angular rate of travel of which is constant and, consequently, the peripheral speed of which varies over a revolution. This acceleration and deceleration of the blades over a revolution of rotation has a disastrous effect on the lives of the rotor components, due to the fact that these variations in speed generate stresses which are all the more substantial as the rigidity of the rotor components is high.

Conversely, it is known that great flexibility about the drag axis of the blades has a highly beneficial effect on the dynamic stresses to which the blades and the components of the rotor hub are subjected, which is why the introduction of the flapping hinge has been accompanied by the introduction of the drag hinge.

These improvements to the original rotary-wing aircraft rotor concepts have led to a rotor fully articulated in pitch, flapping and drag, the main disadvantage of which was to be subject to instability of the ground resonance or air resonance type, which made it necessary to develop and use drag dampers, also known as frequency adapters, or again elastic return drag struts with built-in damping. On helicopter rotors, these drag dampers are arranged in the plane of rotation of the rotor, between the blades and the hub of the rotor in a conventional configuration, or between adjacent blades of the rotor in the inter-blade configuration. In both cases, the presence of the drag dampers increases the aerodynamic drag of the rotor, in particular at the hub and where the hub is connected to the blades, which reduces the overall performance of the helicopter.

On a convertible aircraft of the tilting rotor type presented above, in which the speed of travel in the aeroplane mode is far higher than that of a helicopter, and on which drag dampers, mounted as on a helicopter rotor, would be head on to the wind, this reduction in performance would be far more appreciable, which is why designers of convertible aircraft of this type have endeavoured, for the design of the rotors, to retain hubs which are extremely rigid in drag (known as stiff-in-plane rotors), with no drag dampers, the natural drag frequency of which is greater than the nominal frequency of rotation of the rotor, which eliminates any risk of instability in drag, even in the absence of drag dampers.

However, it is known that rotors which are rigid in drag have the major disadvantage of generating very high stresses when the rotors are tilted. On convertible aircraft, the importance attached to producing rotors of high aerodynamic efficiency, and therefore with no drag dampers, has led to the development of hubs which are not sensitive to Coriolis forces. A particular feature of these hubs, which include hubs with a universal joint drive, is that tilting of the rotor is accompanied by tilting of the drive axis of the latter. Because of this, the rotor drive axis is always perpendicular to the rotor plane, and the trajectory described by the blades always remains a circle in a plane perpendicular to the drive axis of the rotor. This type of drive has been used, for example, on prototype convertible aircraft, particularly the XV15 aircraft.

However, a known particular feature of universal joints is that they are not of the constant velocity type, which manifests itself by the fact that the output speed of these joints is not always equal to the input speed. This speed distortion occurs when the drive and output axes are not co-linear, i.e. in the application considered to driving a rotor in rotation, when cyclic flapping is present. In the simplest configuration of a universal joint, the latter comprises a spider, the joints of which, by one arm of the spider to a driving shaft and by the other arm of the spider to a driven shaft, allow the driven or output shaft to swivel relative to the driving or input shaft. It is known that these speed variations caused by such a universal joint, and transmitted to the driven shaft, correspond to acceleration and deceleration which, over one revolution of rotation of the universal joint, appear twice. The speed of the driven shaft is therefore not constant, but varies at a frequency equal to twice the frequency of rotation of the shafts.

To eliminate these speed variations, which are responsible for very substantial inertial forces, in the case of a rotary-wing aircraft rotor, which affect the hub as a whole and are prejudicial to the durability of the mechanical assemblies constituting the hub or associated with the latter, several constant velocity drive systems have been proposed, particularly so-called Clemens drive links, composed of assemblies of two branches hinged respectively to the driving and driven shafts and connected by a swivel, and also tripod joints, for which transmission of movement is provided by means of balls moving in axial grooves machined in the driving and driven shafts.

These arrangements are used to ensure that the drive point is always situated in a plane bisecting the axes of the driving and driven shafts. As the distances from this point to the axes of the two shafts are then identical, the speeds of rotation of the two shafts are strictly equal whatever the angular position of the two shafts, which guarantees that the transmission provides a constant velocity drive.

These two known constant velocity drive systems are not suitable for application to convertible aircraft rotors for the following reasons:

installing Clemens drive links on a convertible aircraft rotor hub very substantially increases the drag of the hub, which reduces its performance and increases operating costs;

tripod joints are not suitable in particular because of the high torque levels encountered on convertible aircraft rotor hubs, which require large diameter and therefore heavy balls to keep the contact surface Hertz pressures at acceptable levels.

In other arrangements, the swivelling and drive functions are kept separate. This is the case in the constant velocity drive system of the V22 tilting rotor convertible aircraft, in which the swivelling function is provided by two halves of a spherical laminated flapping thrust bearing enclosing the hub and connected to the rotor mast. This function absorbs the lift and the coplanar loads due to the aerodynamic and inertial excitation of the rotor. The mast drives the rotor (transmits the torque) by three drive links each connected at one end to the hub and at the other end to the mast.

A variant of this system is proposed in patent U.S. Pat. No. 5,145,321, in which the drive function is provided by substantially parallelepiped-shaped swivel bearings.

A particular feature of these separate means providing the swivelling and drive functions of the hub relative to the rotor mast is that they are kinematically not compatible in the absence of flexibility of the elements connecting the hub to the mast, and constant velocity drive is obtained only by careful tailoring of the rigidity of these connecting elements. Where cyclic flapping of the rotor is present, each drive link mentioned above is subject to dynamic stress at a frequency equal to twice the frequency of rotation of the rotor, the phase depending on the position of this link relative to the hub. For regularly spaced links, in a circumferential direction about the axis of rotation, the phase difference between the dynamic loads on the links is such that the contributions to the dynamic torque cancel each other out, which is a necessary and sufficient condition for constant velocity drive of the hub by the rotor mast.

Another major disadvantage of this type of hub in addition to the disadvantages regarding the need for flexibility of the connecting elements and for accurate tailoring of drive link rigidity is that the enclosing arrangement of the halves of the flapping thrust bearing make it difficult to inspect the links in particular and the torque transmission system in general, as well as hampering access to these for maintenance purposes.

In patent U.S. Pat. No. 5,145,321 mentioned above, the vertical shear of a substantially parallelepiped-shaped swivel bearing allows the rotor to tilt about an axis perpendicular to the axis joining the centre of the bearing to the rotor drive axis. Movement of the rotor about a second pivot axis is made possible by the ball joint fitted inside the parallelepiped-shaped bearing. In the same way as for a system where the hub is driven by the mast via links, as presented above, a minimum number of three bearings with closely similar levels of rigidity is required to obtain a constant velocity drive. The flexibility required for correct operation is also directed according to the direction of drive in rotation.

SUMMARY OF THE INVENTION

The problem addressed by the invention is to propose a constant velocity drive rotary-wing aircraft rotor, in particular for a convertible aircraft with at least one tilting rotor, all of the constant velocity drive means and tilting means of which have the following degrees of freedom:

two degrees of freedom in rotation about two coplanar axes, secant, for tilting of the hub and therefore of the rotor, no degrees of freedom in translation, which is equivalent, in terms of loads, to:

the loads, i.e. lift and the coplanar loads, being applied along the two axes considered above and along the axis about which the drive in rotation takes place, and:

the moments being applied about the axis of rotation of the rotor mast only, which corresponds to the drive torque of the hub, the swivelling capability of these means being therefore only partial, since they offer no freedom of rotation of these means about the mast, the rotor of the invention providing a solution to the disadvantages of state-of-the-art rotors of this type, and such as presented above, and in particular not requiring the presence of laminated connecting elements produced with accurately tailored rigidity to obtain a constant velocity drive, while making the swivelling and driving means kinematically compatible, whether these means are separate or merged, and even in the absence of a specific flexibility provided by laminated connecting elements.

To this end, the invention proposes a rotary-wing aircraft rotor with constant velocity drive for a convertible aircraft with at least one tilting rotor, comprising:

a rotor mast, capable of being driven in rotation about its longitudinal axis, a hub, connected to said mast by a constant velocity drive mechanism and by a tilting arrangement, allowing the hub as a whole to tilt about any flapping axis converging with the axis of the mast and perpendicular to said axis of the mast, so that said hub is capable of being driven in constant velocity rotation by said mast, about a geometrical axis of rotation of the hub which may be inclined in any direction about the axis of the mast, and at least two blades, each linked to said hub by a coupling retaining and hingeing its blade in pitch, wherein said constant velocity drive mechanism comprises a differential mechanism for splitting static torque and allowing relative movement, in a plane perpendicular to said axis of the mast, between at least two devices for driving the hub, said differential mechanism comprising a set of three discs positioned substantially one above another and substantially coaxial about said axis of the mast, and of which a first disc, arranged between second and third discs along said axis of the mast, is a driving disc, integral in rotation with said mast, and connected to each of the second and third discs, which are driven, by at least one connecting pin, having a longitudinal geometrical axis substantially parallel to said axis of the mast, and hinged to each disc in the set by one respectively of three ball joint connections substantially centred on the longitudinal geometrical axis of said connecting pin, each of the second and third discs being connected to the hub by one at least of said at least two driving devices, which are each also hinged to the hub, so as to drive it in rotation about said geometrical axis of rotation of the hub.

According to a first embodiment, the second disc (hereinafter referred to as a first of the driven discs) drives in rotation, about said axis of the mast, and preferably via two drive pins coaxial about a first diametral axis of said mast, a first driving device arranged as a first gimbal, mounted so as to pivot about said first diametral axis, which is substantially perpendicular to said axis of the mast, by two first bearings diametrically opposite relative to said axis of the mast; and the third disc (hereinafter referred to as a second of the driven discs) drives in rotation, about said axis of the mast, and preferably also via two drive pins coaxial about a second diametral axis of the mast, a second driving device, arranged as a second gimbal, mounted so as to pivot about the second diametral axis, which is substantially perpendicular to said axis of the mast and to said first diametral axis, and converging with this latter on said axis of the mast, by two second bearings diametrically opposite relative to said axis of the mast, said first gimbal being in addition hinged to the hub by two first ball joint connections, diametrically opposite relative to said axis of the mast, and each centred substantially in a plane defined by said axis of the mast and said second diametral axis, and said second gimbal being in addition hinged to said hub by two second ball joint connections, diametrically opposite relative to said axis of the mast, and each centred substantially in a plane defined by said axis of the mast and said first diametral axis, so that the gimbals, their pivot bearings on the driven discs and their ball joint connections hingeing them to the hub constitute the arrangement for tilting of the hub as a whole whilst belonging to the constant velocity drive mechanism of the hub.

In this embodiment, the rotor according to the invention comprises means of driving and hingeing the hub by and relative to the mast which are based on a universal joint of which the two successive hinges would be combined at the same location between the driving body, the rotor mast, and the driven body, the hub, in such a way that this device has the advantage of simultaneously performing the two functions of swivelling and torque transmission by means of a small number of parts, which makes it relevant in terms of weight, cost and maintenance.

The main advantage of such a rotor according to the invention, with its three-disc differential mechanism, compared with a similar rotor not equipped with such a mechanism, is that it enables the drive means to provide a constant velocity drive, without the need to define connecting elements having specific flexibility and substantially the same torsional rigidity in the two torque transmission trains connecting the mast to the hub, and each passing through one respectively of the gimbals.

In fact, in order that the swivelling means and the tilting means should be compatible kinematically, it is necessary for the two gimbals to be able to perform small relative angular deflections about the geometrical axis of rotation of the hub. This is the result of the fact that where the hub is tilted relative to the mast and about an axis not converging with the pivot axes of the gimbals, pivoting of the gimbals in the absence of flexibility between the two torque transmission trains causes rotation of the gimbals in opposite directions about the drive axis of the rotor. Pivoting of one of the gimbals tends to cause the hub to advance, in the direction of rotation of the rotor, whereas pivoting of the other gimbal tends to cause the hub to retreat (rotating in the opposite direction to the direction of rotation of the rotor). To escape from this hyperstatic state, an additional degree of freedom is introduced along the drive axis, and this is obtained precisely by means of the three-disc differential mechanism, allowing splitting of the static torque transmitted from the mast to the two gimbals and relative movement of the two gimbals. In fact, any tilting of the rotor and its hub on the mast induces a relative cyclic rotation of the two gimbals at a frequency of 2 $\Omega$, which is compensated for kinematically by the connecting pins hinged to the three discs, and allowing rotation of the driven discs in opposite directions relative to the driving disc, and about the axis of the mast.

The presence of this differential mechanism means that it is no longer necessary to use laminated connections with tailored rigidity on the swivel bearings and ball joint connections of the gimbals. However, it is advantageous for the pivot bearings of the gimbals on the driven discs and/or the ball joint connections hingeing the gimbals to the hub to comprise cylindrical, spherical or truncated cone-shaped elements, or a combination of such elements with the aim of reducing the friction induced by the kinematics of the two gimbals and thus increasing the lives of the components.

According to a second embodiment, each of the driven discs drives in rotation about said axis of the mast, via two drive pins, two driving devices arranged as links, diametrically opposite and aligned substantially tangentially relative to said axis of the mast, the drive links being regularly arranged around said axis of the mast, so that each of the two links driven by one of the driven discs is between the two links driven by the other driven disc, each drive link being hinged at one of its ends to one respectively of the two drive pins of one respectively of the driven discs and, at its other end, to an end fitting attaching it to the hub.

The advantage of such a rotor with a differential mechanism connected to the links providing a drive function kept separate from the swivelling function, compared with rotors of the same type with no differential mechanism, is that the constant velocity characteristics of the drive are not obtained by the generation of large out-of-phase loads which are cancelled out when added together, but because of the kinematic compatibility introduced by the differential mechanism. Accurate tailoring of the rigidity of the links is not necessary, which greatly simplifies the design of the latter.

However, each drive link is still advantageously equipped at each of its two ends with a ball joint connection, preferably comprising a laminated ball joint, for hingeing one end of said link to a drive pin of a driven disc, and hingeing the other end of said link to an end fitting for attaching to the hub, in order to relieve the links of any superfluous stresses in their angular deflection relative to the driven discs, on the one hand, and to the hub on the other, when the latter is tilted.

In this second embodiment, the swivelling function, kept separate from the drive function, may be provided in a manner known in itself, by at least one half of a central laminated spherical flapping thrust bearing, and preferably by two halves of a thrust bearing of this type which enclose the central part of the hub and the drive means, each half of the thrust bearing having at least one member connected to the hub and at least one member integral in rotation with the mast.

The spherical flapping thrust bearing thus constituted transmits to the rotor mast the lift and coplanar loads applied to the rotor.

However, even in the first embodiment, with a double gimbal combined with a differential mechanism, in order to improve the rigidity of the rotor in cyclic flapping, the hub may also and advantageously be connected to the mast by at least one elastic return member returning the hub to a rest position substantially perpendicular to the axis of the mast, and in a manner known in itself, these elastic return member may advantageously comprise at least one half of a central laminated spherical thrust bearing, of which at least one part is connected to the hub and at least one other part is integral in rotation with the mast. This half of a spherical thrust bearing may be fitted under the central part of the hub, the constant velocity drive mechanism and the tilting arrangement and, if in addition the elastic return member also comprises an upper half of a central laminated spherical thrust bearing, which covers and encloses the central part of the hub, a central laminated spherical thrust bearing is then obtained which assists in transmitting to the rotor mast the lift and coplanar loads applied to the rotor.

In the different embodiments, for proper distribution of the loads involved in connecting the driving disc to the two driven discs in order to ensure proper kinematic compensation, it is advantageous for the differential mechanism to comprise at least two pins connecting the three discs, said connecting pins being arranged regularly in a circumferential direction about said axis of the mast and, more particularly at least two assemblies of at least two adjacent connecting pins per assembly, said assemblies of connecting pins being regularly distributed in a circumferential direction about said axis of the mast. To facilitate limited amplitude rotation in opposite directions of the driven discs relative to the driving disc and to the mast, each connecting pin is advantageously hinged in the driving disc by a central ball joint connection of larger diameter than the diameter common to the two end ball joint connections of said connecting pin, and by each of which said connecting pin is hinged in one respectively of the two driven discs. According to a simple structure, each connecting pin is advantageously a triple ball joint pin.

To improve their strength, these connecting pins, subject to torque loads, may be laminated and advantageously exhibit a certain flexibility along their longitudinal geometrical axis, in order to allow even distribution of the loads passing through each connecting pin, but this flexibility is not critical for the transmission to be of the constant velocity type. It is also necessary in a radial direction, relative to the axis of the mast, for kinematic reasons. To this end, each of the three ball joint connections of each connecting pin is preferably laminated and also comprises a cylindrical laminated bearing, substantially coaxial with said connecting pin.

For transmitting the lift load and the coplanar loads from the hub to the mast, each driven disc is advantageously mounted axially between two radial annular bearings, surrounding said mast and substantially coaxial about said axis of the mast, and allowing rotation, about said axis of the mast, of each of said driven discs relative to said mast and to the driving disc and, moreover, at least one axial bush is preferably mounted between a peripheral and axially offset portion of each driven disc and the driving disc, in order to allow relative rotation, about said axis of the mast, of the driven discs relative to the driving disc and to said mast.

These radial annular bearings and/or axial bushes may be plain, but advantageously comprise cylindrical and/or truncated cone-shaped and/or spherical laminated elements.

In a simple manner, for transmission of the torque, the driving disc is made integral in rotation with said mast by internal axial splines engaged with external axial splines on an end portion of said mast, axially at the opposite end to the base of said mast, by which the latter is driven in rotation.

In addition, a first of the two driven discs may be arranged axially between the driving disc and an outer radial shoulder integral in rotation with said mast, while the second driven disc is arranged axially between the driving disc and a device for axial preloading of the assembly of the three discs, and mounted on the free end of said mast.

In the different modes of embodiment, it is advantageously simple for each driven disc to support two drive pins diametrically opposite relative to said axis of the mast, and by which the corresponding driven disc is connected to one at least of said driving devices, the drive pins of the two driven discs extending substantially in the same plane perpendicular to the axis of said mast.

In order that the hub may advantageously be rigid in its plane, and that all of the constant velocity drive means and, where appropriate, the tilting means are suitably protected, the devices for driving the hub in rotation from the driven discs are advantageously connected to a hub casing, which surrounds said driving devices and said assembly of three discs, and is attached to a hub plate connected to the blades and having a central opening through which said mast runs. The hub plate may then be a plate of known type, of composite material, and in the form of a star with outward-extending arms equal in number to the number of the blades and on each of which are mounted the coupling for retaining and hingeing a blade in pitch, this arrangement providing good rigidity in drag and a certain flexibility along the flapping axis.

BRIEF DESCRIPTION OF THE DRAWINGS

Other characteristics and advantages of the invention will emerge from the description given below of examples, though not limited to these, of embodiments described with reference to the appended drawings in which:

FIGS. 3 and 4 are schematic views in axial section of the differential mechanism in FIG. 2 respectively along III—III and IV—IV, FIG. 5 is an exploded perspective view of the differential mechanism in FIGS. 2 to 4 as fitted to a rotor mast, FIG. 10 is a schematic view in axial cross-section of the three bladed rotor hub in FIG. 9 with its tilting means arranged as half of flapping thrust bearing.

DETAILED DESCRIPTION OF SPECIFIC EMBODIMENTS

Figure 1:
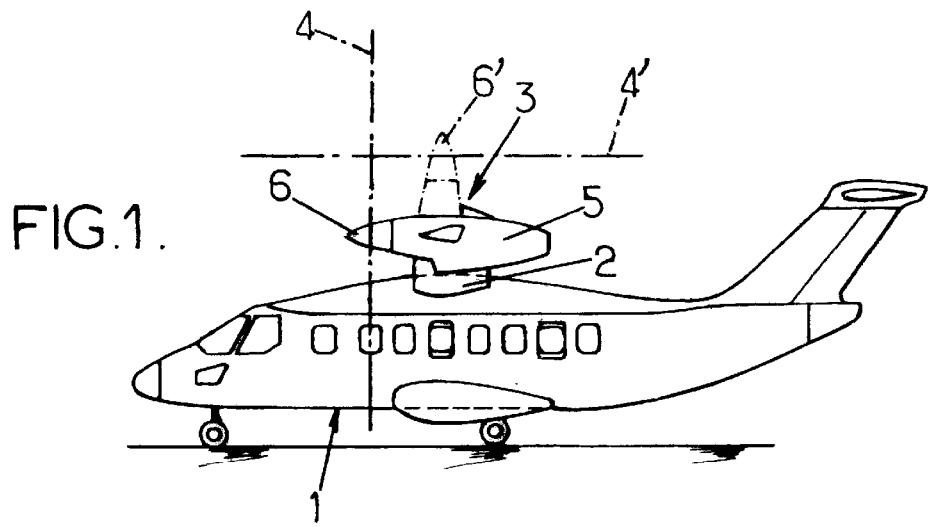
FIG. 1 shows schematically, in side elevation, a convertible aircraft with tilting rotors designed to be equipped with constant velocity drive rotors according to the invention.

FIGS. 2 to 6 show a differential torque splitting mechanism, fitted to a rotor mast, for driving in rotation the hub of a convertible aircraft tilting rotor, as described above with reference to FIG. 1.

Figure 7:
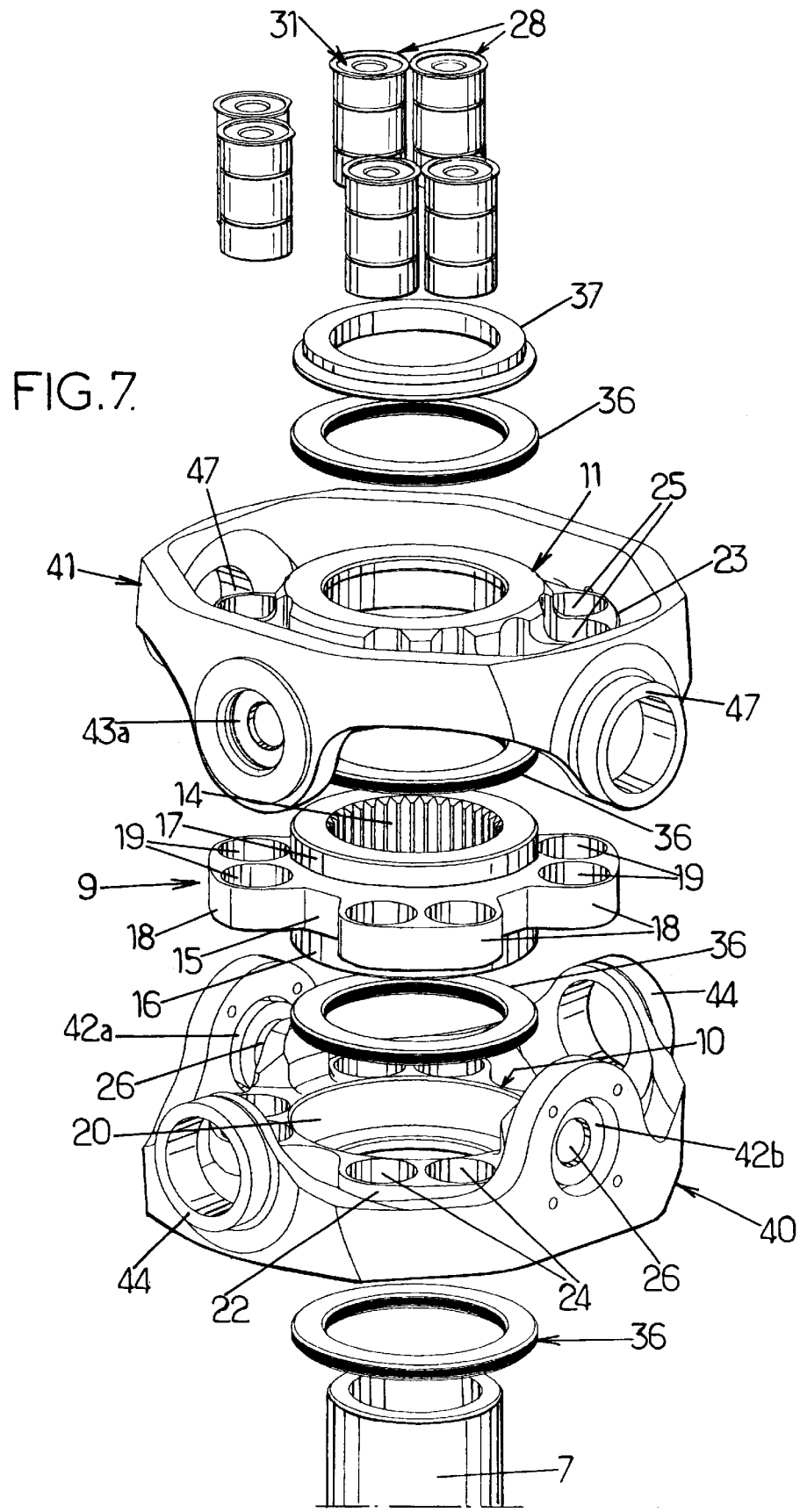
FIG. 7 is an exploded view in perspective similar to FIG. 5, and showing the fitting of the differential mechanism in a two-gimbal assembly constituting at the same time the means of driving and the means of tilting a rotor hub, not shown in FIG. 7, but similar to those in FIG. 9.
Figure 8:
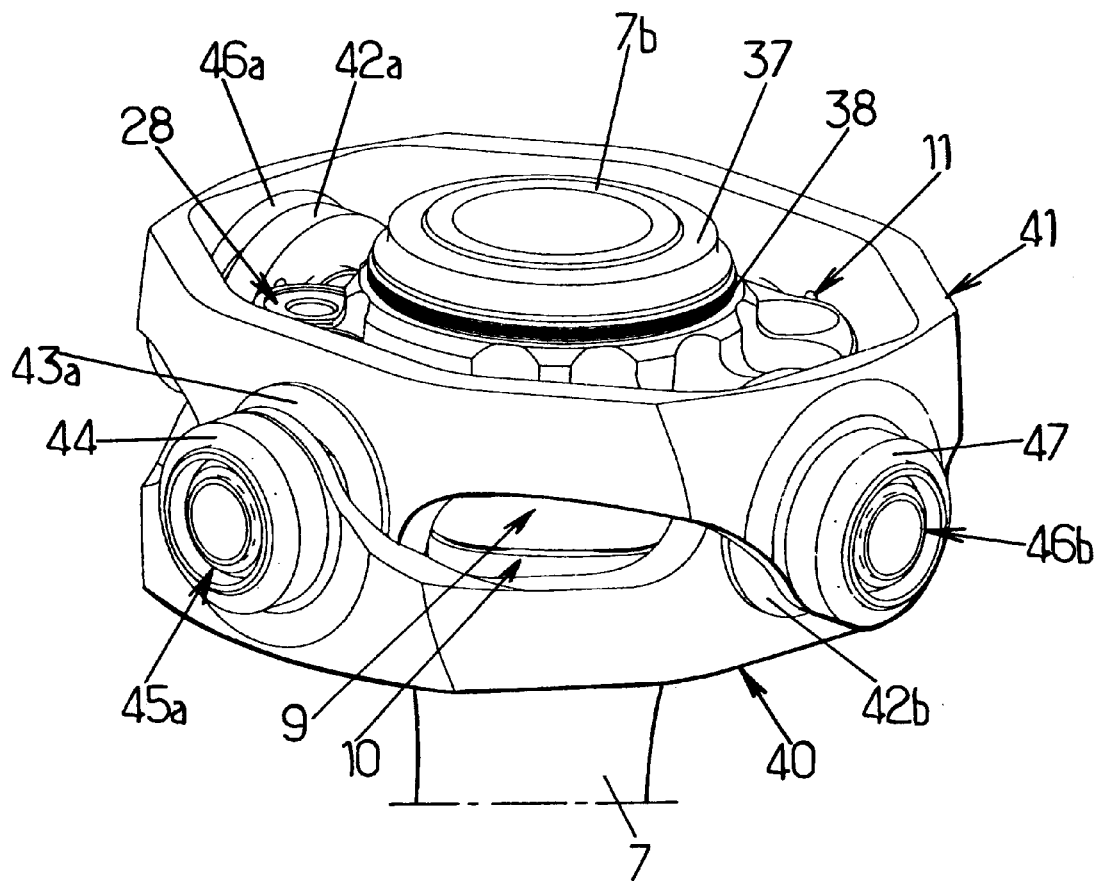
FIG. 8 is a corresponding view in perspective which shows the differential mechanism and the double-gimbal assembly fitted one on top of the other.
Figure 9:
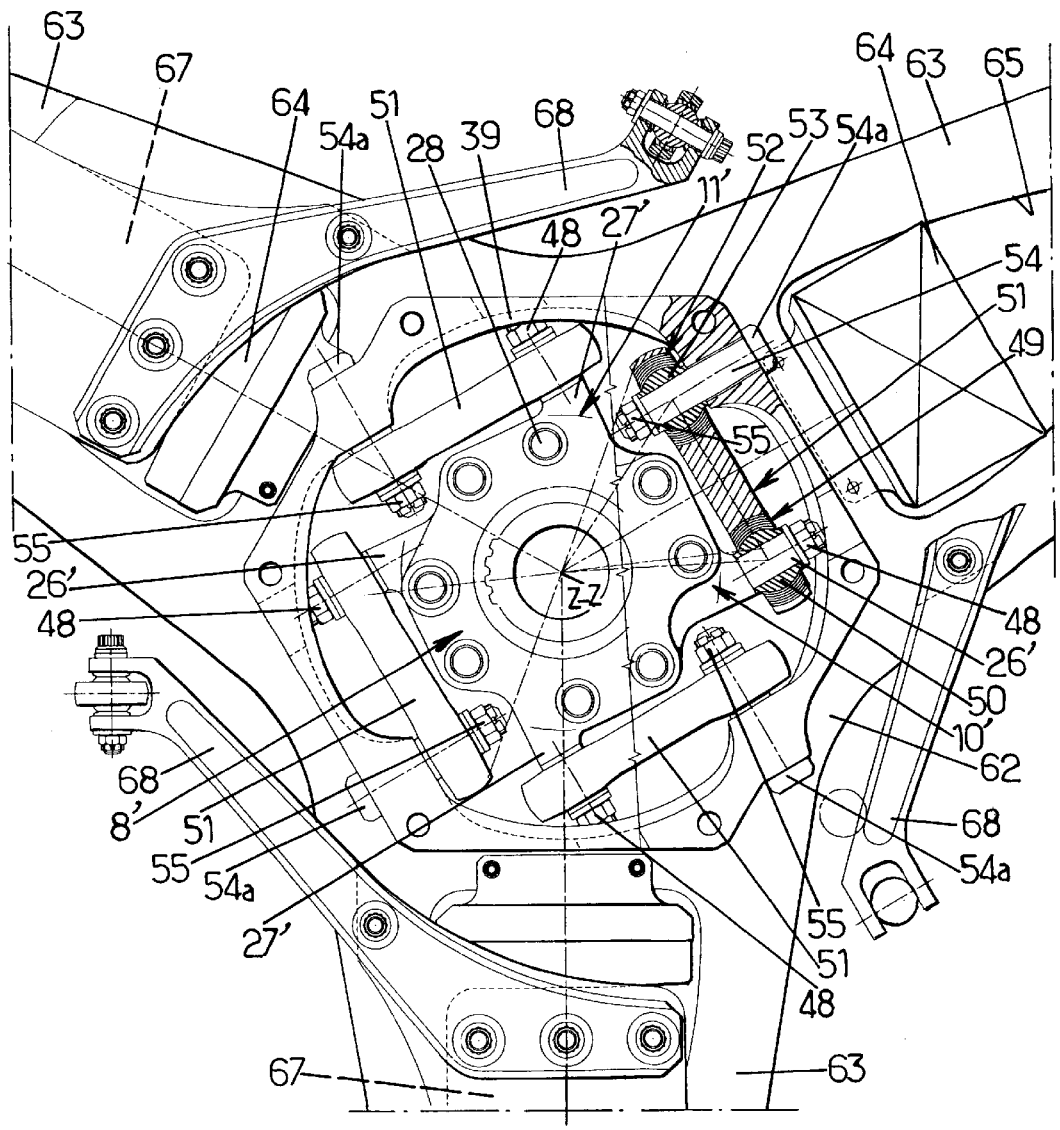
FIG. 9 is a schematic view partly in plan and partly in cross-section of a second mode of embodiment, in which a differential mechanism drives a three-bladed rotor hub via links.

In a first embodiment, this differential mechanism may be associated with a two-gimbal device, as shown in FIGS. 7 and 8, for driving in rotation and tilting a rotor hub, which may be such as shown in FIGS. 9 and 10, on which, according to a second embodiment, the differential mechanism drives the hub in rotation via drive links, the tilting means comprising half of a flapping thrust bearing as shown in FIG. 10.

In FIGS. 2 to 6, the mast 7 of the rotor, driven by its base (not shown) in rotation about its longitudinal axis Z—Z, supports, at its free end portion (at the opposite end to the base) a differential mechanism, designated as a whole by the number 8. This mechanism 8, which belongs to the means for constant velocity drive of the rotor hub, mainly comprises an assembly of three discs coaxial about the axis Z—Z and placed one on top of the other along this axis, a central disc 9 of which is arranged axially between the other two discs 10 and 11, one of which, arranged axially between the central disc 9 and a seating shoulder 12, annular, peripheral and projecting radially towards the outside on the shaft 7, is termed an inner disc 10, as it is arranged along the axis Z—Z at the base end of the shaft 7, and therefore towards the inside of the convertible aircraft structure, while the third disc 11, termed the outer disc, is arranged axially between the central disc 9 and an axial preload device 13, fitted to the free end of the shaft 7, to provide axial stacking (along Z—Z) of the three discs 9, 10 and 11 of the assembly with preloading, under the conditions and for the reasons which are explained below.

The central disc 9 is made integral in rotation with the mast 7 by internal axial splines 14 in its central bore, which are engaged with external axial splines on a cylindrical end portion 7a of the mast 7, to transmit the torque. As can also be seen in FIG. 7, the central disc 9 has a central portion 15, between two cylindrical journals 16 and 17 at the axial ends, which are extended radially towards the outside by four spider arms 18 each drilled with two cylindrical bores 19 side by side and with parallel axes. The four spider arms 18 are diametrically opposite in twos, and regularly distributed over the periphery of the central portion 15 of the central disc 9.

Each of the inner 10 and outer 11 discs comprise a peripheral portion respectively 20 and 21, which is offset axially towards the central portion 15 of the central disc 9 and surrounds the inner axial journal 16 (the lower one in the drawings) or respectively the outer axial journal 17 (the upper one in the drawings) of the latter, and each of the peripheral portions 20 and 21 respectively of the inner disc 10 and of the outer disc 11 also has, projecting radially towards the outside, four spider arms respectively 22 and 23, also diametrically opposite in twos and regularly distributed over the periphery of said peripheral portions 20 and 21, and each also drilled with two bores respectively 24 and 25 side by side and with parallel axes, and of the same diameter as the bores 19 in the central disc 9.

Figure 6:
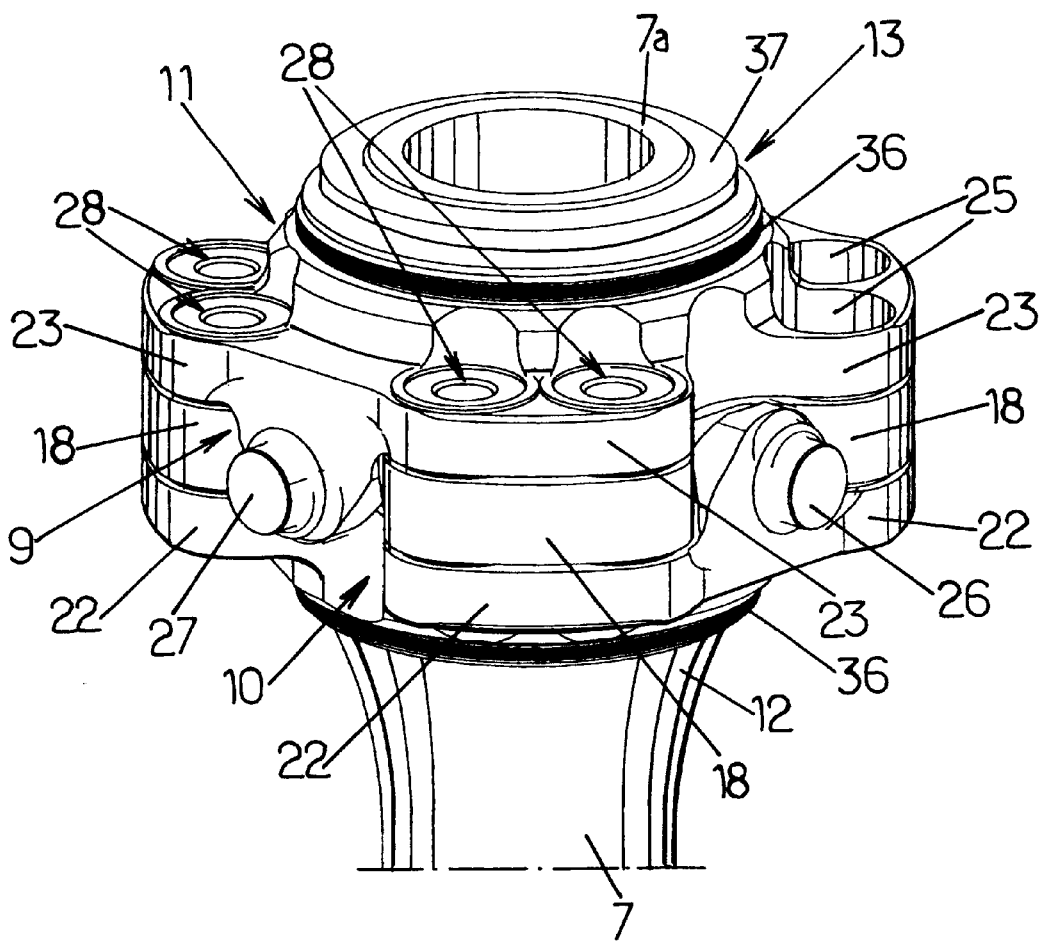
FIG. 6 is the corresponding view in perspective of the differential mechanism in FIG. 5 fitted to the mast.

Moreover, the inner disc 10 supports two drive pins 26, of generally cylindrical shape with a circular cross-section, with axes contained within a radial (relative to the axis Z—Z) plane, and which project towards the outside of the inner disc and occupy diametrically opposite positions, each being between two spider arms 22 of this disc 10, and at the same time offset axially towards the central portion 15 of the central disc 9, so that they can be housed in one of the cut-away portions, delimited at the periphery of this central portion 15 of the central disc 9, between two spider arms 18 of this disc 9, (see FIGS. 5 and 6). Similarly, the outer disc 11 has two drive pins 27, of the same cylindrical form with a circular cross-section and of the same size as the pins 26 and also diametrically opposite and projecting towards the outside of the peripheral portion 21 of this disc 11, while being at the same time offset axially towards the central portion 15 of the central disc 9, so that they can each be housed in one of the four cut-away portions delimited by the spider arms 18 on the periphery of the central disc 9 and alternating in a circumferential direction about the axis common to these three discs 9, 10 and 11, with the drive pins 26 of the inner disc 10.

Figure 2:
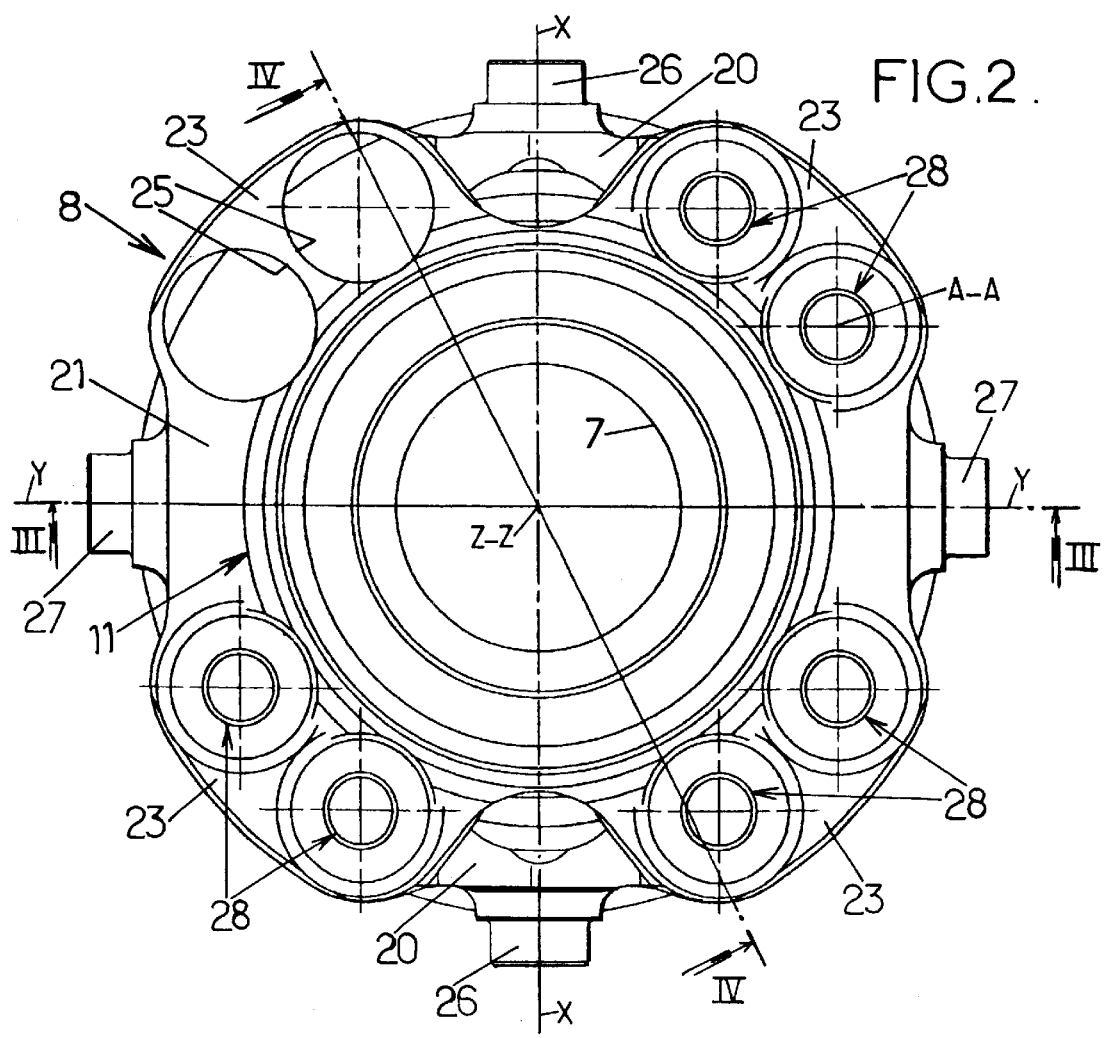
FIG. 2 is a schematic view in plan of a differential mechanism for means for the constant velocity drive of a rotor according to the invention.

The three discs 9, 10 and 11 are placed one on top of the other axially so that at rest the spider arms 18, 22 and 23 are directly above each other, and the bores 19, 24 and 25 aligned between one disc and another, as shown in the left-hand half-view in FIG. 4, so that, in each of the eight groups of three bores 19, 24 and 25 aligned in this way, there can be housed one respectively of eight connecting pins 28, distributed in this way, over the periphery of the three discs, in four assemblies of two adjacent connecting pins 28, radially at the same distance from the axis Z—Z of the mast 7, and distributed regularly in four pairs of connecting pins 28, diametrically opposite in twos and along two diametral planes perpendicular to each other, as shown in FIG. 2.

Each connecting pin 28 has its longitudinal geometrical axis A—A substantially parallel to the axis Z—Z of the mast 7, and is hinged in each of the three corresponding spider arms 18, 22 and 25 by one respectively of three ball joint connections 29, 30 and 31 which are centred on the axis A—A. As shown in the right-hand half-view in FIG. 4, each connecting pin 28 is a pin with triple ball joints, with a central ball joint 32 with a larger diameter than that of the two end ball joints 33, of the same diameter, each of the ball joints 32 and 33 being a laminated ball joint retained radially (relative to the axis A—A) inside a cylindrical laminated bearing 34 (for the central ball joint connection 29) and 35 (for each of the end ball joint connections 30 and 31), the cylindrical laminated bearings 34 and 35 being substantially coaxial about the geometrical axis A—A of the corresponding connecting pin 28. For this reason, each connecting pin 28 is in the form, viewed from the outside, of a cylindrical sleeve divided axially into three parts placed one on top of the other and slightly spaced apart from each other, with a radial collar at the upper end (see FIG. 7) and each enclosing the three ball joint connections 29, 30 and 31 offset along the axis A—A.

After the eight connecting pins 28 are installed, the central disc 9, integral in rotation with the shaft 7, is a driving disc for the inner disc 10 and outer disc 11, which are driven discs of the mechanism 8, and each of which can drive in rotation, about the axis Z—Z, and by its two corresponding drive pins 26 or 27, at least one of driving devices connected to the hub to cause the latter to rotate, which are each hinged to the hub, so as to drive the latter in rotation, from the rotation of the mast 7.

For the reasons explained below, in order to allow relative rotation, about the axis Z—Z of rotation of the mast 7, between each of the driven discs 10 and 11, on the one hand, and on the other, the driving disc 9 and the mast 7, each of the driven discs 10 and 11 is mounted, in its portion which surrounds the mast 7, axially between two radial annular bearings 36, surrounding the mast 7 and substantially coaxial about the axis Z—Z of the latter. Thus the central portion of the driven discs 10 is fitted between an inner radial bearing 36, seated against the shoulder 12 of the mast 7, and an outer radial bearing 36 seated against the inner axial end of the journal 16 of the driving disc 9, while the central portion of the other driven disc 11 is fitted between an inner radial bearing 36, seated against the outer end face of the journal 17 of the driving disc 9, and another outer radial bearing 36 with loads applied axially, in the direction which applies axial preloading to the stack of the three discs 9, 10 and 11 and of the four bearings 36, by the axial preload device 13 which, in these drawings, is shown schematically as consisting of a nut 37 screwed around the externally threaded free end 7b of the shaft 7.

In practice, this axial preload device 13 is advantageously embodied as those which are fitted to helicopter main rotor heads, i.e. the nut 37 does not bear directly against the outer bearing 36, but has running through it axially a ring of clamping screws, regularly distributed over the periphery of the nut 37, and the ends of which bear against a spacer, stressed elastically in compression, and itself bearing against the outer face (the upper one in FIGS. 3 to 6) of the outer bearing 36. Such an axial preload device with a spacer compressed axially and elastically is used on a convertible aircraft rotor for the same reason as on a helicopter main rotor, namely to avoid lift separation, since the latter as well as the coplanar loads in the rotor are transmitted in the mode of embodiment described below with reference to FIGS. 7 and 8 by the driven discs 10 and 11 to the driving disc 9 and to the mast 7.

In addition to the radial annular bearings 36, which may be plain but are preferably each a cylindrical laminated bearing, as shown, or possibly truncated cone-shaped, comprising at least one elastomer washer vulcanised between two metal washers, two axial bushes 38 are provided to facilitate relative rotation between each of the driven discs 10 and 11, on the one hand, and on the other the mast 7 and the driving disc 9. One of the two bushes 38 is fitted between the peripheral portion 20 of the driven disc 10 and the journal 16 of the driving disc 9, while the other axial bush 38 is fitted between the peripheral portion 21 of the other driven disc 11 and the other journal 17 of the driving disc 9. These two axial bushes 38 are also substantially coaxial about the axis Z—Z of the mast 7 and/or, preferably, laminated and each consisting of the least one cylindrical laminated element with at least one thin cylindrical layer of elastomer between two rigid annular members. As a variant, the axial bushes 38 may also comprise truncated cone-shaped or spherical laminated elements substantially coaxial about the axis Z—Z.

In the example in FIGS. 2 to 6, the differential mechanism 8 is such that the two drive pins 26 of the driven disc 10 are not only diametrically opposite relative to the axis Z—Z, but project radially towards the outside of the driven disc 10, perpendicularly to the axis Z—Z, and coaxial about a first diametral axis X—X of the mechanism 8 and of the mast 7, so that the pins 26 constitute a first diametral drive arm integral with the driven disc 10. Similarly, the two drive pins 27 of the driven disc 11, also diametrically opposite relative to the axis Z—Z and perpendicular to the latter, overhanging and projecting radially towards the outside of the driven disc 11, and coaxial about a second diametral axis Y—Y of the mechanism 8 and which at rest is perpendicular to the first diametral axis X—X and converging with the latter on the axis Z—Z, constitute a second diametral drive arm, integral in rotation with the driven disc 11 and, when the mechanism 8 is at rest, perpendicular to the first diametral drive arm formed by the pins 26.

This differential mechanism 8 is compatible with a double-gimbal device, as shown in FIGS. 7 and 8, for a rotor in which this double-gimbal device constitutes both the driving means and the tilting means placed between the differential mechanism 8 on the one hand and, on the other, a rotor hub supporting blades, and which is thus mounted so as to pivot about any flapping axis intersecting the axis Z—Z of the mast 7 and extending in any direction about this axis Z—Z, so that the hub, and therefore the rotor, can be driven in rotation about a geometrical axis inclined in any direction about the axis Z—Z of the mast 7.

In FIGS. 7 and 8, the double-gimbal device comprises a first gimbal 40, substantially in the shape of an octagon (viewed in plan) mounted so as to pivot relative to the mast 7 about the first diametral axis X—X by two first bearings 42a, 42b which may be plain cylindrical bearings or, preferably, bearings consisting of cylindrical, conical, and/or where appropriate spherical laminated elements, mounted so as to swivel on the drive pins 26 of the driven disc 10, while a second gimbal 41, also substantially octagonal in shape, and arranged above the first gimbal 40, is mounted so as to pivot in a similar manner by two second bearings such as 43a (the other one is not visible in FIGS. 6 and 7), of the same type as the bearings 42a and 42b, on the drive pins 27 of the driven disc 11, so that the second gimbal 41 can pivot relative to the mast 7 about the second diametral axis Y—Y.

The two gimbals 40 and 41 are thus each driven in rotation by one respectively of the driven discs 10 and 11, themselves driven by the mast 7 and the driving disc 9, about the axis Z—Z of the mast 7, while being mounted so as to pivot each about one respectively of the two diametral axes, normally perpendicular, X—X, Y—Y, and secant, which are the axes of the two drive arms 26—26 and 27—27 driving in rotation.

In addition, the first gimbal 40 is hinged to a casing or hub body, such as the one shown as 39 with an annular shape substantially hexagonal in plan in FIGS. 9 and 10, by two first ball joint connections such as 45a (see FIG. 8), preferably comprising laminated ball joints, each combined with a cylindrical or conical laminated bearing, and which are diametrically opposite relative to the axis Z—Z of the mast 7, and each centred on the second diametral axis Y—Y, being retained in two small sleeves coaxially about the axis Y—Y on the gimbal 40, in the neutral or rest position of the rotor, the two first ball joint connections such as 45a remaining centred substantially in a diametral plane, defined by the axis Z—Z and by the second diametral axis Y—Y, when the first gimbal 40 is pivoted about the first diametral axis X—X.

In a similar manner, the second gimbal 41 is hinged to a hub body such as 39 in FIGS. 9 and 10 by two second ball joint connections 46a and 46b, also preferably comprising laminated ball joints combined with cylindrical or conical laminated bearings and, diametrically opposite relative to the axis Z—Z and each centred, at rest or in the neutral position of the rotor, on the first diametral axis X—X, while being retained in small sleeves 47 coaxial about the axis X—X on the gimbal 41, these second ball joint connections 46a and 46b remaining substantially centred in a diametral plane defined by the axis Z—Z and the first diametral axis X—X when the second gimbal 41 is pivoted about the second diametral axis Y—Y.

In this rotor, the hub such as 39 in FIGS. 9 and 10 is connected to the mast 7 by two crossing gimbals 40 and 41, hinged to the inside of the hub such as 39 by ball joint connections, preferably laminated such as 45a and 46a, 46b, and hinged so as to pivot about the two perpendicular diametral drive arms 26—26 and 27—27, at rest, by bearings 42a, 42b and such as 43a, according to an arrangement at the same time constituting a mechanism for tilting the hub and the blades, allowing pivoting of the hub as a whole about any flapping axis intersecting the axis Z—Z of the mast 7 and running in any direction about the axis Z—Z, and a mechanism giving constant velocity drive of the hub and of the blades about a geometrical axis of rotation of the hub, which may be inclined in any direction about the axis Z—Z of the mast 7 by causing the gimbals 40 and 41 to pivot about their respective diametral axes X—X and Y—Y. The torque is transmitted between the mast 7 and the hub by two transmission trains each comprising the mast 7, the driving shaft 9, one respectively of the driven discs 10 and 11, and therefore the gimbal 40 or 41 pivoting on the driven disc 10 or 11, the corresponding two bearings 42a, 42b or such as 43b, the corresponding two ball joint connections such as 45a or 46a, 46b and the hub.

With a pivoting device of this type with two gimbals 40 and 41, it is known that tilting of the rotor disc and therefore of the hub relative to the axis Z—Z of the mast 7 induces a cyclic relative rotation of these two gimbals 40 and 41, at a frequency of 2 Ω (where Ω is the frequency of rotation of the rotor), the two gimbals 40 and 41 performing rotation movements in opposite directions and of equal amplitude about the drive axis and in a plane perpendicular to this drive axis. The differential mechanism 8 compensates kinematically for this cyclic relative rotation of the two gimbals 40 and 41, by means of the connecting pins 28, linking the driven discs 10 and 11 to the driving disc 9, and which are inclined slightly while accompanying the rotation of the driven discs 10 and 11 in opposite directions about the axis Z—Z of the mast 7. At the same time, the static torque transmitted by the mast 7 to the two gimbals 40 and 41 is split by the driving disc 9 between the two driven discs 10 and 11, by means of the connecting pins 28. This capability of the differential mechanism 8 to allow any relative movement of the two gimbals 40 and 41 in the plane perpendicular to the drive axis eliminates the hyperstatic characteristics of a device in which the tilt mechanism with two gimbals would be directly connected to the mast 7.

The constant velocity characteristics are thus obtained by the kinematic compatibility between the tilting and drive means using two gimbals 40 and 41, by means of the differential mechanism 8.

The differential mechanism 8 with reduced travel avoids the need to use laminated bearings and/or laminated hinges with tailored rigidity for connecting the gimbals 40 and 41 to the hub and to the mast 7. However, these laminated bearings and laminated ball joint connections are preferably introduced between the gimbals 40 and 41, on the one hand, and the driven discs 10 and 11 and the hub on the other, in order to reduce the friction induced by the kinematics of the two gimbals 40 and 41 and thus increase the lives of the components.

Transmission of the loads from the rotor (lift and coplanar loads) to the mast 7 is provided, from the hub to the mast 7, via the two gimbals 40 and 41 which, in opposite directions, transmit the torque from the mast 7 to the hub. The radial annular bearings 36 and the axial bushes 38, allowing relative rotation between the driven discs 10 and 11 (connected to the gimbals 40, 41) and the driving disc 9 connected to the mast 7, assist in transmitting the lift load and the coplanar loads, the lift also being transferred through the presence of the axial preload device 13 with elastic deformation of the stack of the three discs 9, 10 and 11 and of the four annular radial bearings 36 against the shoulder 12 on the mast 7.

Embodying the connecting pins 28 in the form of triple laminated ball joints 29, 30 and 31 associated with cylindrical laminated bearings 35 improves the strength of these connecting pins 28, which have a certain flexibility parallel to their longitudinal axis A—A, particularly because of the presence of the cylindrical laminated bearings 35, so as to allow homogeneous division of the loads passing through each connecting pin 28, while preventing the end ball joints 33 of each pin 28 from coming adrift from the driven discs 10 and 11 when the connecting pins 28 are inclined by the rotation in opposite directions of the driven discs 10 and 11 relative to the driving disc 9. Where there is inclination of these pins 28, the laminated elements of the ball joints and of the bearings 35 of the pins 28 also allow a necessary centripetal compression due to the fact that the end ball joints 33 tend to move away from the axis Z—Z of the mast 7, while each being kept as a constant distance from this axis Z—Z by the driven disc 10 or 11 in which each ball joint 33 is held. Finally, these laminated elements allow not only relative axial movement of the ball joints of the pins 28 and of the three discs 9, 10 and 11, but also relative rotation between each pin 28 and each of the three discs 9, 10 and 11 in which this pin 28 is swivel jointed. However, the flexibility introduced by these laminated elements of the connecting pins 28 is not critical for the constant velocity characteristics of the torque transmission.

When the device with two gimbals 40 and 41 is not enclosed by halves of a spherical flapping thrust bearing, the laminated bearings such as 42a, 42b and 43a and/or the laminated ball joint connections, such as 45a, 46a and 46b must be able to transmit the loads from the rotor (lift and coplanar loads) and, to this end, at least these laminated connecting bearings between gimbals 40 and 41 and the driven discs 10 and 11 and/or at least these laminated ball joint connections hingeing the gimbals 40 at 41 to the hub must be able to transmit an axial load, along the corresponding diametral axis X—X or Y—Y, which is at the same time an axis of symmetry of the laminated elements constituting these bearings and ball joint connections, which can be provided, in a simple manner, by using truncated cone-shaped laminated elements to embody these bearings such as 42a, 42b and 43a, and/or of the ball joint connections such as 45a, 46a and 46b.

On the other hand, where there are halves of a spherical flapping thrust bearing present, enclosing the system of gimbals 40 and 41, for dynamic reasons in particular, and allowing an increase in rigidity in cyclic flapping, by assisting in transmission of the lift and coplanar loads from the hub to the mast 7, so that these loads do not necessarily have to be taken by the laminated elements of the bearings such as 42a, 42b and 43a and/or of the ball joint connections such as 45a, 46a and 46b, it is not necessary for these bearings and ball joint connections to comprise truncated cone-shaped laminated elements, or any other laminated elements capable of transmitting an axial load.

An example of a rotor with the swivelling and drive functions of the hub kept separate is described below with reference to FIGS. 9 and 10.

This rotor comprises a differential mechanism 8', identical to the mechanism 8 in FIGS. 2 to 8, except as regards the two drive pins 26' of the inner driven disc 10' and the two drive pins 27' of the outer driven disc 11', these pins 26' and 27' being no longer coaxial in twos about one respectively of the two diametral axes, perpendicular at rest, of the mast 7', or projecting radially towards the outside of the corresponding driven disc 10' or 11', relative to the axis Z—Z of the mast 7', but extending towards the outside of the corresponding driven disc 10' or 11', from two points diametrically opposite on this disc, and along two axes parallel but offset from each other in the same radial plane perpendicular to the axis Z—Z of the mast 7', the axes of the two pins 26' being aligned in a direction substantially perpendicular to the direction of alignment of the axes of the two pins 27', as can be seen in FIG. 9.

Each of these drive pins 26' and 27', the axes of which are therefore coplanar, is fitted and retained by a nut 48 screwed onto the corresponding threaded external end of the pin 26' or 27', in the inner radial member 50 of a laminated ball joint 49, constituting a ball joint connection at one end of one respectively of four drive links 51, which are regularly spaced apart from each other in a circumferential direction about the axis Z—Z, being arranged substantially tangentially relative to this axis Z—Z, substantially as in the four sides of a square, viewed in plan, as shown in FIG. 9. Each of the four links 51 is equipped at its other longitudinal end with another ball joint connection constituted by a second laminated ball joint 52, identical to the laminated ball joint 49, the inner radial member 53 of which is fitted and retained about one respectively of four cylindrical end fittings 54 providing attachment to the hub casing 39, which surrounds the differential mechanism 8' and the four links 51 for driving the hub casing 39 in rotation from the mast 7' and via the differential mechanism 8.

In a practical manner, each attachment end fitting 54 is a screw, the head 54a of which is retained on the outside of the annular hub casing 39, and such a nut 55 is screwed onto the threaded end of its shank, which runs through the inner member 53 of the ball joint 52 of the corresponding link.

Thus, as shown in FIG. 9, each of the two driven discs 10' and 11' is connected, by each of its two drive pins 26' or 27', to one respectively of two driving links 51, also connected to the hub casing 39 and diametrically opposite, each extending in a circumferential direction about the axis Z—Z, alternating with the two driving links 51 connected to the other driven disc 11' or 10'.

In this example, the devices driving the hub casing 39, placed between the latter and the differential mechanism 8', are not two crossing gimbals but four drive links 51, hinged by end ball joint connections, on the one hand to one of the driven discs, for two of them, and to the other of the driven discs for the other two links, and on the other hand to the inner face of the annular hub casing 39.

The direction of drive in rotation of the mast 7' and the fitting of the links 51 are such that the links 51 have tensile loads applied by the rotation of the differential mechanism 8' with the shaft 7' to drive the hub casing 39.

In this rotor, the constant velocity drive means are constituted by the combination of the differential mechanism 8' and the drive links 51, the end ball joint connections of which allow the necessary deflection when the hub casing 39 is tilted with the whole of the hub relative to the axis Z—Z of the mast 7', while the differential mechanism 8' remains radially connected to the mast 7', the differential mechanism 8' functioning exactly in the same manner as in the previous example for splitting the torque between the two pairs of links 51 each coupled to one respectively of the two driven discs 10' and 11', the usefulness of this device being that it does not generate high stresses or require precise tailoring of the rigidity of the laminated ball joints 49 and 52 at the ends of the links 51, which considerably simplifies the design of these links 51.

Another difference exhibited by the differential mechanism 8' of this example compared with the one described previously is that the radial annular bearing 36 arranged axially inside the inner driven disc 10' no longer bears axially against a shoulder such as 12 on the mast such as 7 in FIGS. 3 in 4, but against a shoulder 12' at an outer axial end of a tubular spacer 56 which surrounds the mast 7' and itself bears axially, at its inner axial end, against a support 57 of the inner radial member of half of a flapping thrust bearing 58, which is half of a laminated central spherical thrust bearing constituting, in a manner known in itself, the means of tilting the hub as a whole, which elastically return the hub, and therefore the rotor, to the rest position, substantially perpendicular to the axis Z—Z of the mast 7'.

This flapping thrust bearing 58 is arranged, in this example and as shown in FIG. 10, as half of a spherical thrust bearing in two stages, since its outer radial member 59, like the inner radial member support 57, is connected in rotation to the mast 7', by keying, splining or any other equivalent means, being held axially against a shoulder 60 on the mast 7' by the axial stack of the inner member support 57, also arranged as a tubular spacer, by the spacer 56 and by the axial stack of the three discs 9', 10' and 11' of the differential mechanism 8', under the action of the axial preload device 13 at the free end of the mast 7.

The flapping thrust bearing 58 comprises a dish-shaped intermediate member 61 which is attached to the lower face of a hub plate 62 by a ring of screws 63 which at the same time attach the hub casing 39 to the upper face of the hub plate 62.

Thus, the device for constant velocity drive of the hub 39-62 relative to the mast 7' is housed and protected inside the hub casing 39, while the hub plate 62 is suspended and hinged to the mast 7' by the flapping thrust bearing 58, and may be connected to the blades of the three-bladed rotor in this example.

The hub plate 62 is, for example, a plate made of composite material and in the form of a star with as many outward-extending arms 63 as the rotor has blades, three in this example, so that each blade is retained and hinged in pitch to the corresponding arm 63 by an appropriate coupling, indicated partially and schematically by the number 64 in FIGS. 9 and 10. This coupling 64 is fitted on the one hand at the outer radial end (not shown) of each arm 63 and, on the other hand, in a recess 65 made in the part of the arm 63 adjacent to the central part of the hub plate 62, this central part having a central opening 66 through which the rotor mast 7' runs.

In a known manner, the connection between the retaining and hingeing coupling means 64 in the recess 65 and the additional retaining and hingeing means (not shown) at the outer end of the arm 63 is provided by a cuff 67 rigid in torsion, integral with the root of the blade and embodied, for example, by two plates one directly above the other and aligned radially so as to straddle the corresponding hub arm 63. The inner radial end of this cuff 67 is integral with a pitch change lever 68 for controlling the pitch of the corresponding blade.

It should be noted that such a hub plate 62 with arms 63 extending outwards has both high rigidity in drag and appropriate flexibility in flapping, while permitting a favourable arrangement of the pitch change lever 68, the end yoke of which, for connection to a pitch control rod, is outside the hub plate 62, between two arms 63, and such that pitch-flapping coupling of a small negative value can be retained, which is particularly favourable for the tilting rotors of convertible aircraft, for which low control power is also desirable, which is in fact obtained with the rotors previously described, the flapping eccentricity of which is nil, due to the fact that the flapping axes of the blades intersect the axis of the mast 7 or 7' because of the tilting of the rotor as a whole by its hub about a point on this axis Z—Z.

In this example, in which the drive means with links 51 and differential mechanism 8' are kinematically compatible with the tilting means, using half of a laminated central spherical thrust bearing 58, the latter also takes the lift and the coplanar loads due to the aerodynamic and inertial excitation of the rotor, in particular if it is supplemented by another half of a laminated central spherical flapping thrust bearing, enclosing the hub casing 39 and the constant velocity drive means housed inside the latter, substantially symmetrically on the other side of the hub plate 62 relative to the half of a flapping thrust bearing 58.

By comparison with known driving devices using links and tilting devices using a central flapping thrust bearing, the rotor in FIGS. 9 and 10 has the essential advantage that the constant velocity characteristics of the drive in rotation of the hub 39-62 from the mast 7' are obtained by cooperation of the differential mechanism 8' with the drive links 51 not requiring precise tailoring of their rigidity, and without generating high stresses, in drive means kept separate from the means of tilting the hub.

In the first example, with reference to FIGS. 2 to 8, it is clear that the device with two gimbals 40 and 41 may be hinged inside a hub casing fixed, as in the second example in FIGS. 9 and 10, to a hub plate in the form of a star with arms each supporting a blade by means for retaining and hingeing in pitch, as described above.

In both examples, the three-bladed rotor in FIGS. 9 and 10 may be a four-bladed rotor, as is the rotor associated with the device in FIG. 8.

Finally, in all the examples of embodiment, the laminated elements such as cylindrical or truncated cone-shaped bearings, and the laminated ball joints, possibly combined with cylindrical or truncated cone-shaped bearings, are elements comprising two members in inner radial and outer radial positions relative to their axis of symmetry, and each of the members is attached to one respectively of the two components between which each laminated elements is fitted and which it hinges to each other.

The invention has now been described in detail for the purposes of clarity of understanding. It will, however, be appreciated that certain changes and modifications may be practised within the scope of the appended claims.

What is claimed is:

1. A rotary-wing aircraft rotor with constant velocity drive, comprising:

a rotor mast capable of being driven in rotation about a longitudinal axis of said mast, a hub connected to said mast by a constant velocity drive mechanism and by a tilting arrangement, allowing pivoting of the hub as a whole about any flapping axis converging with the axis of the mast and perpendicular to said axis of the mast, in such a way that said hub is capable of being driven in constant velocity rotation by said mast, about a geometrical axis of rotation of the hub which may be inclined in any direction about the axis of the mast, and at least two blades, each linked to said hub by a coupling retaining and hingeing the blade in pitch, wherein said constant velocity drive mechanism comprises a differential mechanism for splitting static torque and allowing relative movement, in a plane perpendicular to said axis of the mast, between at least two devices for driving the hub, said differential mechanism comprising a set of three discs placed substantially one above another and substantially coaxial about said axis of the mast, a first disc of which, arranged between second and third discs of the set along said axis of the mast, is a driving disc, integral in rotation with said mast and connected to each of the second and third discs, which are driven, by at least one connecting pin having a longitudinal geometrical axis substantially parallel to said axis of the mast, and hinged to each of the discs in the set by one respectively of three ball joint connections substantially centred on the longitudinal geometrical axis of said connecting pin, each of the second and third discs being connected to the hub by at least one of said at least two driving devices which are each also hinged to the hub, so as to drive said hub in rotation about said geometrical axis of rotation of the hub.

2. A rotor according to claim 1, wherein the differential mechanism comprises at least two pins connecting the discs of the set, said connecting pins being regularly arranged in a circumferential direction about said axis of the mast.

3. A rotor according to claim 2, wherein the differential mechanism comprises at least two assemblies of at least two adjacent connecting pins per assembly, said assemblies of connecting pins being regularly distributed in a circumferential direction about said axis of the mast.

4. A rotor according to claim 1, wherein each connecting pin is hinged in the first disc by a central ball joint connection of larger diameter than a diameter common to two end ball joint connections of the said connecting pin and by each of which said connecting pin is hinged in one respectively of the second and third discs.

5. A rotor according to claim 4, wherein each of said three ball joint connections of each connecting pin further comprises a cylindrical laminated bearing, substantially coaxial with said connecting pin.

6. A rotor according to claim 1, wherein each connecting pin is a triple ball joint pin.

7. A rotor according to claim 6, wherein each of the three ball joint connections of each connecting pin also comprises a cylindrical laminated bearing, substantially coaxial with said connecting pin.

8. A rotor according to claim 1, wherein each of the second and third discs is mounted axially between two radial annular bearings, surrounding said mast and substantially coaxial about said axis of the mast, and allowing rotation, about said axis of the mast, of each of said second and third discs relative to said mast and to the first disc.

9. A rotor according to claim 8, wherein said radial annular bearings are selected from the group consisting of plain bearings and elements comprising one of cylindrical, truncated cone-shaped and spherical laminated elements.

10. A rotor according to claim 1, wherein at least one axial bush is fitted between a peripheral and axially offset portion of each disc in the set, in order to allow relative rotation, about said axis of the mast, of the second and third discs relative to the first disc and to said mast.

11. A rotor according to claim 10, wherein said axial bushes are selected from the group consisting of plain bushes and elements comprising one of cylindrical, truncated cone-shaped, and spherical laminated elements.

12. A rotor according to claim 1, wherein the first disc is made integral in rotation with said mast by internal axial splines engaging with external axial splines on an end portion of said mast, the end portion being spaced axially from a base portion of said mast, by which the mast is driven in rotation.

13. A rotor according to claim 1, wherein the second disc is arranged axially between the first disc and an external radial shoulder integral in rotation with said mast, while the third disc is arranged axially between the first disc and a device for axially preloading the set of three discs, and fitted to a free end of said mast.

14. A rotor according to claim 1, wherein each of the second and third discs supports two drive pins diametrically opposite relative to said axis of the mast, and by which the second and third discs are respectively connected to at least one of said driving devices, the drive pins of the second and third discs extending substantially in a common plane perpendicular to the axis of said mast.

15. A rotor according to claim 1, wherein the second disc drives in rotation, about said axis of the mast, and via two drive pins coaxial about a first diametral axis of said mast, a first driving device arranged as a first gimbal, mounted so as to pivot about said first diametral axis, which is substantially perpendicular to said axis of the mast, by two first bearings diametrically opposite relative to said axis of the mast;

and wherein the third disc drives in rotation, about said axis of the mast, and also via two drive pins coaxial about a second diametral axis of the mast, a second driving device, arranged as a second gimbal, mounted so as to pivot about said second diametral axis, which is substantially perpendicular to said axis of the mast and to said first diametral axis, and converging with the first diametral axis on said axis of the mast, by two second bearings diametrically opposite relative to said axis of the mast;

said first gimbal being in addition hinged to the hub by two first ball joint connections, diametrically opposite relative to said axis of the mast, and each centred substantially in a plane defined by said axis of the mast and said second diametral axis, and said second gimbal being in addition hinged to said hub by two second ball joint connections, diametrically opposite relative to said axis of the mast and each centred substantially in a plane defined by said axis of the mast and said first diametral axis;

whereby the gimbals, their pivoting bearings on the second and third discs and their ball joint connections providing hinging to the hub constitute the arrangement for tilting of the hub as a whole whilst belonging to the constant velocity drive mechanism of the hub.

16. A rotor according to claim 15, wherein the first and second bearings of the gimbals on the second and third discs and the ball joint connections hinging the gimbals to the hub comprise at least one element selected from the group consisting of cylindrical, spherical and truncated cone-shaped laminated elements.

17. A rotor according to claim 1, wherein each of the second and third discs drives in rotation, about said axis of the mast, and via two drive pins, two driving devices arranged as links diametrically opposite and aligned substantially tangentially relative to said axis of the mast, the driving devices being regularly arranged about said axis of the mast, so that each of two links driven by one of the second and third discs is between two links driven by another of the second and third discs, each drive link being hinged, at one of its ends, to one respectively of the two drive pins of one respectively of the second and third discs, and, at its other end, to an end fitting for attachment to the hub.

18. A rotor according to claim 17, wherein each drive link is equipped, at each of its two ends, with a ball joint connection, for hinging one end of said link to a drive pin of one of the second and third discs, and hinging another end of said link to an end fitting for attaching to the hub.

19. A rotor according to claim 18, wherein the ball joint connection comprises a laminated ball joint.

20. A rotor according to claim 1, wherein said devices for driving the hub in rotation from the second and third discs are connected to a hub casing, which surrounds said driving devices and said set of three discs, and which is attached to a hub plate connected to the blades and having a central opening through which said mast runs.

21. A rotor according to claim 20, wherein said hub plate is a plate in the form of a star with outward extending arms, one arm for each blade, and to each of which is fitted the coupling for retaining and hingeing its blade in pitch.

22. A rotor according to claim 1, wherein the hub is also connected to the mast by a least one member for elastic return of the hub to a rest position substantially perpendicular to said axis of the mast.

23. A rotor according to claim 22, wherein said elastic return member comprises at least one half of a central laminated spherical thrust bearing, of which one part is connected to the hub and at least one other part is integral in rotation with the mast.

24. A convertible aircraft comprising at least one tilting rotor movable from a first position in which the or each tilting rotor operates as an aeroplane propeller to a second position in which the or each tilting rotor operates as a helicopter main lifting rotor, the or each tilting rotor comprising:

a rotor mast capable of being driven in rotation about its longitudinal axis, a hub connected to said mast by a constant velocity drive mechanism and by a tilting arrangement, allowing pivoting of the hub as a whole about any flapping axis converging with the axis of the mast and perpendicular to said axis of the mast, in such a way that said hub is capable of being driven in constant velocity rotation by said mast, about a geometrical axis of rotation of the hub which may be inclined in any direction about the axis of the mast, and at least two blades, each linked to said hub by a coupling retaining and hingeing the blade in pitch, wherein said constant velocity drive mechanism comprises a differential mechanism for splitting static torque and allowing relative movement, in a plane perpendicular to said axis of the mast, between at least two devices for driving the hub, said differential mechanism comprising a set of three discs placed substantially one above another and substantially coaxial about said axis of the mast, a first disc of which, arranged between second and third discs of the set along said axis of the mast, is a driving disc, integral in rotation with said mast and connected to each of the second and third discs, which are driven, by at least one connecting pin having a longitudinal geometrical axis substantially parallel to said axis of the mast, and hinged to each of the discs in the set by one respectively of three ball joint connections substantially centred on the longitudinal geometrical axis of said connecting pin, each of the second and third discs being connected to the hub by at least one of said at least two driving devices which are each also hinged to the hub, so as to drive it in rotation about said geometrical axis of rotation of the hub.

* * * * *